March 8, 1949.   R. C. HOWELL   2,464,039
BRAKE MECHANISM FOR TRUCK CRANES
Original Filed Dec. 6, 1943
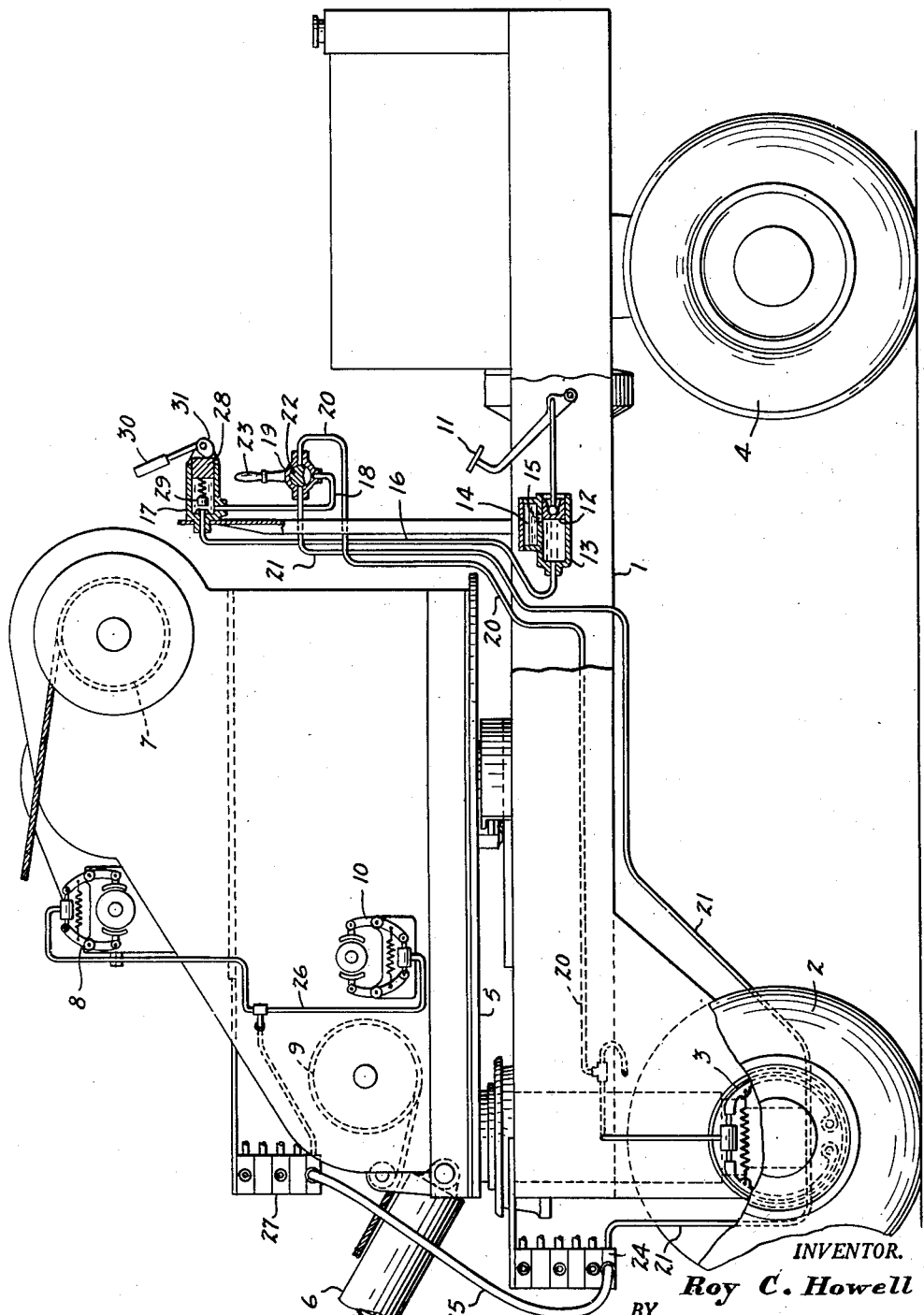
INVENTOR.
Roy C. Howell
BY Frank S. Greene
ATTORNEY.

Patented Mar. 8, 1949

2,464,039

UNITED STATES PATENT OFFICE 2,464,039

BRAKE MECHANISM FOR TRUCK CRANES

Roy C. Howell, Lakewood, Ohio

Original application December 6, 1943, Serial No. 513,204. Divided and this application August 31, 1945, Serial No. 613,805

4 Claims. (Cl. 254—166)

This invention relates to a brake mechanism for motor truck cranes and the like, the present application being a division of my application Serial No. 513,204, filed December 6, 1943.

An important object of this invention is to provide a brake system in which the hoist and vehicle brakes may be so interconnected that the vehicle brakes are set during operation of the hoist and the hoist brakes are set during travel of the vehicle.

A further object of the invention is to provide a simple control for the brake control system by means of which one set of brakes may be locked while the other set is operable at will and by which both sets of brakes may be applied and locked when desired.

With the above and other objects in view, the invention may be said to comprise the brake mechanism as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification in which the truck crane to which the invention is applied is shown in outline in side elevation with the brake mechanism of the present invention thereon.

Referring to the accompanying drawings, the mechanism of the present invention is mounted upon a truck frame 1 supported at its forward end by traction wheels 2 provided with hydraulic brakes 3 of conventional construction and at its rear end upon steering wheels 4. A turntable 5 is mounted on the frame 1 to swing about a vertical axis positioned over the axles of the front wheels 2, the turntable 5 having a boom 6, a boom hoist drum 7 controlled by a hydraulic brake 8 and a load hoist drum 9 controlled by a hydraulic brake 10, the brakes 8 and 10 being applied to shafts that have a driving connection to the drums as is common practice in the art.

The present invention resides in the means employed for operating the wheel and drum brakes. As shown in the drawings, a brake pedal 11 mounted upon the frame 1 operates a piston 12 in a cylinder 13. The cylinder 13 receives a liquid from a reservoir 14 through a lateral port 15 and the piston 12 when actuated by the pedal 11 forces liquid under pressure through a pipe 16 to a cylinder 17 and through the cylinder 17 and a pipe 18 to a valve casing 19 through which liquid may be delivered into either of two pipes 20 and 21 through which pressure is delivered to the drum and wheel brakes. A two way valve 22 in the casing 19 is movable by means of a handle 23 from the neutral position shown in the drawing to a position placing the pipe 18 in communication with the pipe 20 or to a position connecting the pipe 18 to the pipe 21. The pipe 20 delivers liquid under pressure to the hydraulic wheel brakes 3 and the pipe 21 delivers liquid under pressure to the brakes 8 and 10 through a header 24 mounted on the forward end of the truck frame 1, a flexible conduit 25 and a pipe 26 on the turntable 5 to which the flexible conduit 25 delivers through a header 27 mounted on the turntable 5 adjacent the pivotal axis of the turntable, the pipe 26 being connected to the hydraulic brakes 8 and 10.

During propulsion of the motor truck the valve 22 is set in the position to connect the pipe 20 to the pipe 18 so that pressure will be transmitted through the pipe 20 leading to the wheel brakes upon actuation of the pedal 11. During hoisting operations the valve 22 is positioned to deliver pressure through the pipe 21 to the drum brakes. If pressure is being applied either to the wheel or drum brakes when the valve 22 is shifted, the pressure will be retained in such brakes after the valve is shifted because of the fact that the pressure is trapped between the brakes and the valve 22. By shifting the valve 22 while the wheel brakes are being applied, the wheel brakes may be set while the hoisting devices are being operated. By shifting the valve 22 while the winding drum brakes 8 and 10 are being applied, the drum brakes may be set while the truck is traveling. If pressure be maintained in the cylinders 13 and 17 and the pipe 18 while the lever 23 is being shifted to one extreme position to deliver pressure to the wheel brakes, and then to the other extreme position to deliver pressure to the drum brakes, and finally to neutral position, both the wheel brakes and drum brakes will be locked. It is ordinarily desirable that the wheel brakes be set while the hoisting drums are being operated and that the hoist drum brakes be set while the truck is traveling. Also when the truck frame is not in use, it is desirable that both the hoist brakes and the wheel brakes be set. The present invention provides a simple control for the brakes by means of which these results can be accomplished.

In order to apply an increased pressure either to the wheel brakes or to the drum brakes when desired, a piston 28 is provided in the cylinder 17. The piston 28 is normally held in retracted position by fluid pressure and carries a yieldably mounted valve 29 that is adapted to close the port through which the pipes 16 deliver into the cylinder 17. Operation of the brake pedal 11 forces liquid under pressure through the pipe 16 into the cylinder 17 and opens the valve 29. The piston 28 may be actuated to apply an increased pressure to the liquid forced through the valve 22 by means of a lever 30 having a cam 31 bearing against the piston 28. When the lever 30 is actuated the valve 29 is moved to closed position and pressure is applied to the liquid in the cylinder 17 and this pressure is transmitted to the brakes through the valve 22 and the pipe 20 or 21. Actuating pressure may be applied to the liquid in the system by means of the piston 28 when the lever 30 is operated independently of the pedal 11, or the lever 30 may be actuated while the pedal 11 is depressed to hold the pressure and to apply additional pressure.

It is to be understood that variations and modifications of the specific devices herein shown and described for purposes of illustration, may be made without departing from the spirit of the invention.

What I claim is:

1. In a machine of the character described a truck having hydraulic wheel brakes, a hoisting drum on said vehicle, a hydraulic brake for said drum, a pressure creating means on said truck, a valve casing connected to said pressure creating means, a conduit connecting said valve casing with the wheel brakes, a separate conduit connecting said valve casing with the drum brake, and a valve in said casing movable from a position closing the drum brake conduit and connecting said pressure creating means to the wheel brake conduit to a position connecting the pressure creating means to said drum brake conduit and closing said wheel brake conduit.

2. In a machine of the character described a truck having hydraulic wheel brakes, a hoisting drum on said vehicle, a hydraulic brake for said drum, a pressure creating means on said truck, a valve casing connected to said pressure creating means, a conduit connecting said valve casing with the wheel brakes, a separate conduit connecting said valve casing with the drum brake, and a valve in said casing movable from a position closing the drum brake conduit and connecting said pressure creating means to the wheel brake conduit to a position connecting the pressure creating means to said drum brake conduit and closing said wheel brake conduit, said valve being so constructed as to close both of said conduits when in an intermediate position.

3. In a machine of the character described a truck having a hydraulic wheel brake, a hoisting drum on said vehicle, a hydraulic brake for said drum, a valve casing, separate conduits connecting said brakes to said casing, a liquid chamber, a conduit connecting said chamber to said valve casing, operator controlled means for creating a pressure in said liquid chamber, and a manually operable valve in said valve casing movable from a position closing the conduits to both of said brakes to a position connecting the liquid chamber to the wheel brake conduit or to a position connecting the liquid chamber to the drum brake conduit, said valve being operable while pressure is being applied to either of the brakes to close the conduit through which the pressure is being transmitted and set the brake.

4. In a machine of the character described a truck having a hydraulic wheel brake, a hoisting drum on said vehicle, a hydraulic brake for said drum, a valve casing, separate conduits connecting said brakes to said casing, a liquid chamber, a conduit connecting said chamber to said valve casing, operator controlled means for creating a pressure in said liquid chamber, a manually operable valve in said valve casing for connecting either of the brake conduits to said liquid chamber and simultaneously closing the other, and a second pressure creating means operable independently of the first mentioned pressure creating means upon the liquid in the conduit connecting said liquid chamber to said valve casing.

ROY C. HOWELL.

REFERENCES CITED

The following references are of record in the file of this patent:

UNITED STATES PATENTS

| Number | Name | Date |
| --- | --- | --- |
| 1,248,676 | Krausch et al. | Dec. 4, 1917 |
| 2,233,192 | Armington | Feb. 25, 1941 |
| 2,254,083 | Nickles et al. | Aug. 26, 1941 |